J. KENNEDY.
TOGGLE BOLT.
APPLICATION FILED AUG. 28, 1915.

1,168,257.

Patented Jan. 11, 1916.

INVENTOR
Joseph Kennedy
BY
E. W. Marshall
ATTORNEY

UNITED STATES PATENT OFFICE.

JOSEPH KENNEDY, OF NEW YORK, N. Y., ASSIGNOR TO J. EDWARD OGDEN OF MOUNTAINVILLE, TOWN OF CORNWALL, NEW YORK.

TOGGLE-BOLT.

1,168,257.

Specification of Letters Patent.   Patented Jan. 11, 1916.

Application filed August 28, 1915. Serial No. 47,897.

*To all whom it may concern:*

Be it known that I, JOSEPH KENNEDY, a citizen of the United States of America, and a resident of New York, county and State of New York, have invented certain new and useful Improvements in Toggle-Bolts, of which the following is a specification, reference being had to the accompanying drawings, forming a part thereof.

My invention relates to toggle bolts which are adapted to be inserted in an aperture in a wall or the like, the head of the bolt forming an abutment at the back of the aperture for permitting any desired object to be clasped to the surface of the wall by a nut screwed onto the outer end of the bolt or stem.

One object of my invention is to provide an improved bolt of this character that shall be simple and durable in construction and adapted to be inserted in a relatively small hole.

Another object is to provide a head for the toggle bolt which shall be peculiarly arranged to engage the wall at material distances from the hole and that shall be adapted to grip the wall so as to prevent the bolt or stem from turning while the nut is being tightened on its outer end.

Still another object is to provide a head that shall be susceptible of manufacture in large quantity at small cost.

Other objects and advantages of my invention will be set forth hereinafter, and in order that my invention may be thoroughly understood, I will now proceed to describe the same in the following specification and then point out the novel features thereof in the appended claim.

Figure 1:
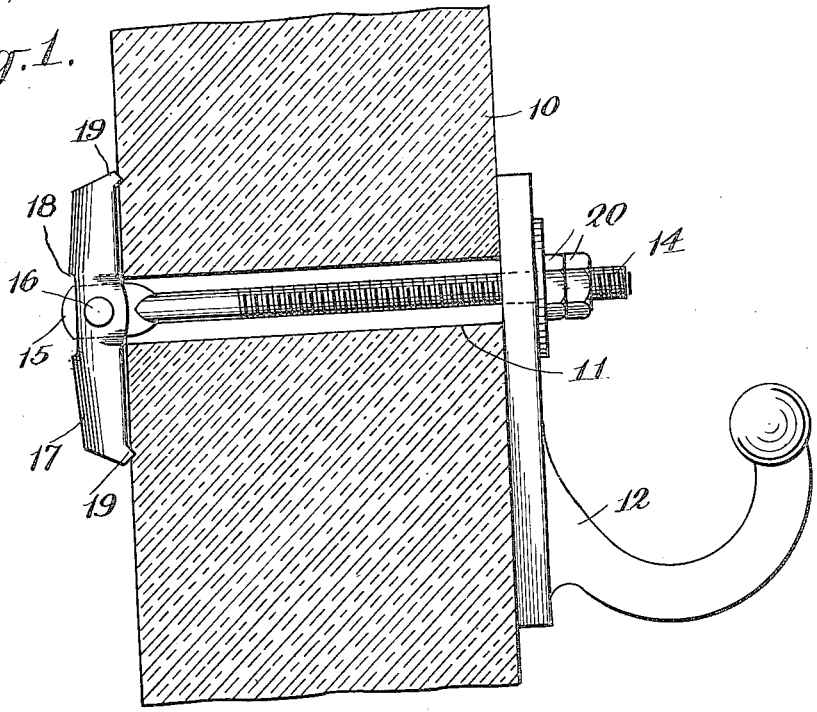
Figure 2:
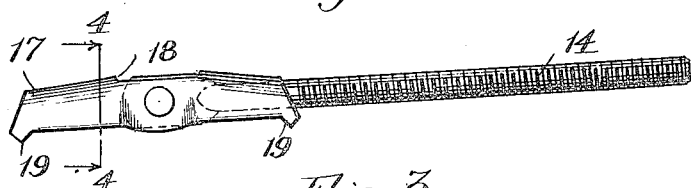
Figure 3:
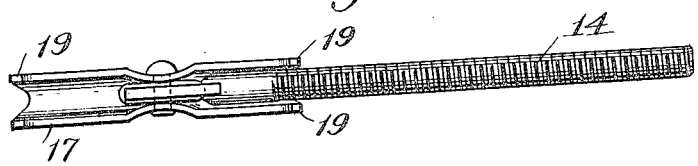
Figure 4:
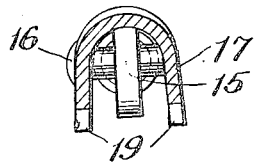

Referring to the drawings: Figure 1 is a sectional view through an aperture in a wall, showing the toggle bolt of my invention in use for securing a hook to the outer surface of the wall. The toggle bolt is shown in position to be inserted through the aperture in the wall in Fig. 2. Fig. 3 is a view corresponding to Fig. 2, but taken at right angles thereto. Fig. 4 is a sectional view drawn to a larger scale, taken on the line 4—4 of Fig. 2.

10 represents a wall in which is a relatively small hole or aperture 11. It is desired to securely fasten some object as, for example, a hook 12, to the outer surface of the wall. This is accomplished by the toggle bolt of my invention which comprises a threaded bolt or stem 14 having a flattened head 15 at one end to which is secured by a pivot pin 16, a toggle head 17. The head is formed of sheet metal bent into a U-shaped section, the part adjacent to the pivot which is slightly off center being pressed close together and transversely perforated to receive the pivot pin 16. The head 17 has an aperture 18 near the center of its back, and has its four corners sharpened to form points 19. These corners extend beyond the body of the toggle head and are adapted to engage the wall as shown in Fig. 1, at material distances from the edge of the aperture 11 in the wall. This is of special advantage because first, it prevents the bolt from turning in the aperture when nuts such as 20 are being screwed onto its outer end; second, it relieves the wall from pressure close to the aperture and thus avoids the possibility of breaking the wall at the aperture. The latter is of special importance when the toggle head has the general form above indicated, because as clearly indicated in Figs. 1 and 2, the head at the point of attachment to the shank is curved, thus providing extra metal to give increased strength. Therefore, if it were not for the projections 19 this outwardly curved portion of the toggle head would press directly against the wall at the edge of the hole. The aperture 18 in the toggle head permits the free movement of the toggle head relative to the flattened head 15 of the shank, although the head of the shank may extend considerably beyond the pivot pin 16 which passes through it. By this means the strength of the connection may be increased since there is no tendency for the pivot pin to tear out of the head 15.

Other advantages of my invention will suggest themselves to those skilled in this art and variations in size and details may be effected within the spirit and scope of my invention, and I intend that only such limitations be imposed as are indicated in the appended claim.

What I claim is:

A toggle bolt comprising a stem and a toggle head connected to the stem at one end, said head having a forwardly extending curved portion at the point of connection with the stem, and end projections extending forwardly beyond the said curved portion and adapted to engage the rear surface of a wall at a distance from the aperture therein through which the stem passes, and thus support the head, whereby the said curved portion is prevented from bearing against the edges of such aperture.

In witness whereof, I have hereunto set my hand this 27th day of August, 1915.

JOSEPH KENNEDY.

Witnesses:
 E. G. SCHWEING,
 I. B. MOORE.